United States Patent
Wang et al.

(10) Patent No.: US 11,720,522 B2
(45) Date of Patent: Aug. 8, 2023

(54) EFFICIENT USAGE OF ONE-SIDED RDMA FOR LINEAR PROBING

(71) Applicant: Oracle International Corporation, Redwood Shores, CA (US)

(72) Inventors: Tinggang Wang, Columbus, OH (US); Shuo Yang, Columbus, OH (US); Hideaki Kimura, Palo Alto, CA (US); Garret F. Swart, Palo Alto, CA (US); Spyros Blanas, Columbus, OH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 194 days.

(21) Appl. No.: 17/176,856

(22) Filed: Feb. 16, 2021

(65) Prior Publication Data

US 2021/0390075 A1    Dec. 16, 2021

Related U.S. Application Data

(60) Provisional application No. 63/038,333, filed on Jun. 12, 2020.

(51) Int. Cl.
*G06F 16/245* (2019.01)
*G06F 15/173* (2006.01)

(52) U.S. Cl.
CPC ...... *G06F 15/17331* (2013.01); *G06F 16/245* (2019.01)

(58) Field of Classification Search
CPC .................. G06F 15/17331; G06F 16/245
See application file for complete search history.

(56) References Cited

U.S. PATENT DOCUMENTS

| | | | |
|---|---|---|---|
| 2018/0341653 A1* | 11/2018 | Teotia ............... | G06F 15/17331 |
| 2019/0095342 A1* | 3/2019 | Porat-Stoler .......... | G06F 12/121 |
| 2020/0014688 A1* | 1/2020 | Kohli .................... | H04L 9/0891 |
| 2020/0125368 A1* | 4/2020 | Kaldewey ........... | G06F 16/2456 |

OTHER PUBLICATIONS

Behringer, Benjamin et al. "Memory Management for Concurrent RDMA: A Design for a Key-Value Store", 2014 (Year: 2014).*
Mitchell, Christopher et al. "Using One-Sided RDMA Reads to Build a Fast, CPU-Efficient Key-Value Store", 2013 USENIX Annual Technical Conference, pp. 103-114 (Year: 2013).*
Oortwijn, Wytse et al. "A Distributed Hash Table for Shared Memory", Springer International Publishing Switzerland 2016 (Year: 2016).*

* cited by examiner

*Primary Examiner* — Alicia M Willoughby
(74) *Attorney, Agent, or Firm* — Hickman Becker Bingham Ledesma LLP

(57) ABSTRACT

Systems and methods for reducing latency of probing operations of remotely located linear hash tables are described herein. In an embodiment, a system receives a request to perform a probing operation on a remotely located linear hash table based on a key value. Prior to performing the probing operation, the system dynamically predicts a number of slots for a single read of the linear hash table to minimize total cost for an average probing operation. The system determines a hash value based on the key value and determines a slot of the linear hash table to which the hash value corresponds. After predicting the number of slots, the system issues an RDMA request to perform a read of the predicted number of slots from the linear hash table starting at the slot to which the hash value corresponds.

16 Claims, 5 Drawing Sheets

EFFICIENT USAGE OF ONE-SIDED RDMA FOR LINEAR PROBING

BENEFIT CLAIM

This application claims the benefit under 35 U.S.C. § 119(e) of Provisional Application No. 63/038,333, filed Jun. 12, 2020, the entire contents of which is hereby incorporated by reference as if fully set forth herein.

FIELD OF THE DISCLOSURE

The present disclosure relates to techniques for storing and retrieving data in a remotely located linear hash table. More specifically, the present disclosure relates to techniques for dynamically adjusting read sizes of RDMA read requests sent to a remotely located linear hash table.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

One efficient manner of storing data for lookups is through hash tables. Hash tables are data structures that map keys to values. In performing a lookup for a value corresponding to a particular key, a system applies a hash function to the particular key to compute a hash value. The hash value thus produced is used as an index value which identifies an initial slot at which to begin a lookup for the value that corresponds to the particular key. During the lookup, the system reads one or more values in the hash table starting at the initial slot. When the hash table is stored in a remote memory, the reads may be implemented using random direct memory access (RDMA) reads.

Similar to a read operation, writing a data value into a hash table involves applying the hash function to the key value associated with the data value. The resulting hash value is used as an index to identify the slot of the hash table into which to write the data value. The hash table slot that corresponds to the hash value produced by a key value is referred to herein as the "hashed-to slot". Unfortunately, there are situations where the hashed-to slot is full. Such situations are referred to as collisions. When a collision occurs, the data value must be inserted into a slot other than the hashed-to slot.

Linear Hash Tables

Different types of hashing schemes handle collisions in different ways. One such scheme, linear probing, involves reading through consecutive slots from the hashed-to slot until an empty slot is identified. The new value can then be stored in the first empty slot that follows the hashed-to slot. When performing an RDMA read using linear probing, the system will identify the hashed-to slot. If the data value is not stored in that slot, then the system will read consecutive slots through the hash table until the system finds either (a) the key value, or (b) an empty slot.

In a linear hash implementation, data is stored in linear hash tables that are accessed remotely, such as through the DBMS. Linear hash tables store data in hash table entries corresponding to index values. Each table entry includes a key/value pairing. In an embodiment, the value of the key/value pairing comprises particular data that was requested to be stored in the linear hash table while the key comprises the key used to generate the hash value. Additionally or alternative, a linear hash table may be stored with a corresponding heap table. The value of the linear hash table entry may thus identify a heap offset which indicates which data field in the heap includes the stored data. Using a heap table allows the hash table to be relatively light, with each slot in the hash table comprising a key signature as the key and an offset value as the value.

In an embodiment, when a request is received to add a new value to the linear hash table, a currently-empty slot of the hash table must be located. To find the currently-empty slot for the new value, a requesting device generates a unique key for the new value, and applies a hash function to the unique key to compute a hash value. The hash value identifies a hashed-to slot of the linear hash table where the search for a currently-empty slot begins. The requesting device sends RDMA read requests to the linear hash table, such as through a database management system, to start reading the linear hash table beginning at the hashed-to slot. If the hashed-to slot is filled, then the system will search through consecutive slots until an empty slot is identified. The database management system then stores a key/value pairing in the empty slot, with the key corresponding to the unique key which was used to compute the hash value, and the value comprising the new value. In situations where the data values are stored in a separate heap table, the content of the slot may be the key signature and an offset value identifying where in a heap table the new value is stored.

The RDMA read request may specify a number of slots to return for a particular read. Thus, a single read request may specify multiple slots to be returned. When the requesting device receives data from the slots, the requesting device may determine if the slots include a slot corresponding to the key value or an empty slot. If neither an empty slot nor a slot corresponding to the key value is received, then the requesting device sends another RDMA read request identifying a next slot to search. Thus, if the first RDMA read request identified three slots to be read, the second RDMA read request may identify a starting slot to read as being three slots down from the hashed-to slot corresponding to the hash value.

A main difference between using a heap table and not using a heap table to store the value is a corresponding size of data being sent from the linear hash table in response to a request. When an RDMA request is sent to a linear hash table without a heap, full data values are sent back for each slot that is read. When an RDMA request is sent to a linear hash table with a heap, only the offset values are sent back for each slot that is read. Thus, if a large number of slots are read prior to finding a first empty slot, the heap implementation reduces the size of responses to the RDMA read requests significantly. One other difference is that the implementation with the heap requires an extra RDMA read request to read the heap entry. Thus, in a situation where the slot corresponding to the computed hash value corresponds to the unique key, the heap implementation may increase the network cost of responding to the RDMA read request over an implementation without the heap given that an extra RDMA read request is being sent for the heap lookup.

One issue with linear probing is that, when a hash table is densely populated (the table with few open slots), the system may have to read through a large number of slots before finding either the key/key signature or an empty slot. In situations where the densely populated hash table is accessed using RDMAs, the need to read a large number of slots can be handled by issuing an RDMA that reads a large amount of data. However, if the amount of data read in each RDMA is too large, unnecessary overhead is wasted by retrieving data from slots beyond the slot with the target data or the first empty slot. On the other hand, if the RDMA read size is set too small, then the system may have to incur the overhead of multiple RDMA operations before finally encountering the target data or an empty slot.

With respect to the size of RDMA reads, an RDMA read request specifies a number of slots to be read from the linear hash table. If the number of slots-to-read is set too low, then multiple requests need to be sent to the linear hash table, causing higher latency costs. Yet if the number of slots-to-read is set too high, then each read would pull a larger amount of data than would be required to find the first empty slot, causing higher latency costs.

FIG. 1 depicts a practical example of the problem discussed above. In FIG. 1, a single hash table 100 is depicted with two versions of reads being performed. The hash table 100 includes occupied slots 102 and empty slots 104. When a request to perform a probing operation on the hash table 100 is performed, a key in the request is transformed through a hash function to find a location of hashed-to slot 106. If a single read 108 (an RDMA operation to read 3 slots) is performed, only occupied slots will be returned, thereby causing the system to send a second request if the target data is not found in any of those slots. On the other hand, if a double read 110 (an RDMA to read 6 slots) is performed, the system will retrieve the first empty slot 112 with a single RDMA request.

Unfortunately, the device issuing the RDMA request rarely knows the positions of each occupied slot and each empty slot. At best, the device may have information on how many occupied slots are in the hash table. Thus, there is a need for a system which reduces the cost of performing linear probes of linear hash tables.

DETAILED DESCRIPTION

Figure 1:
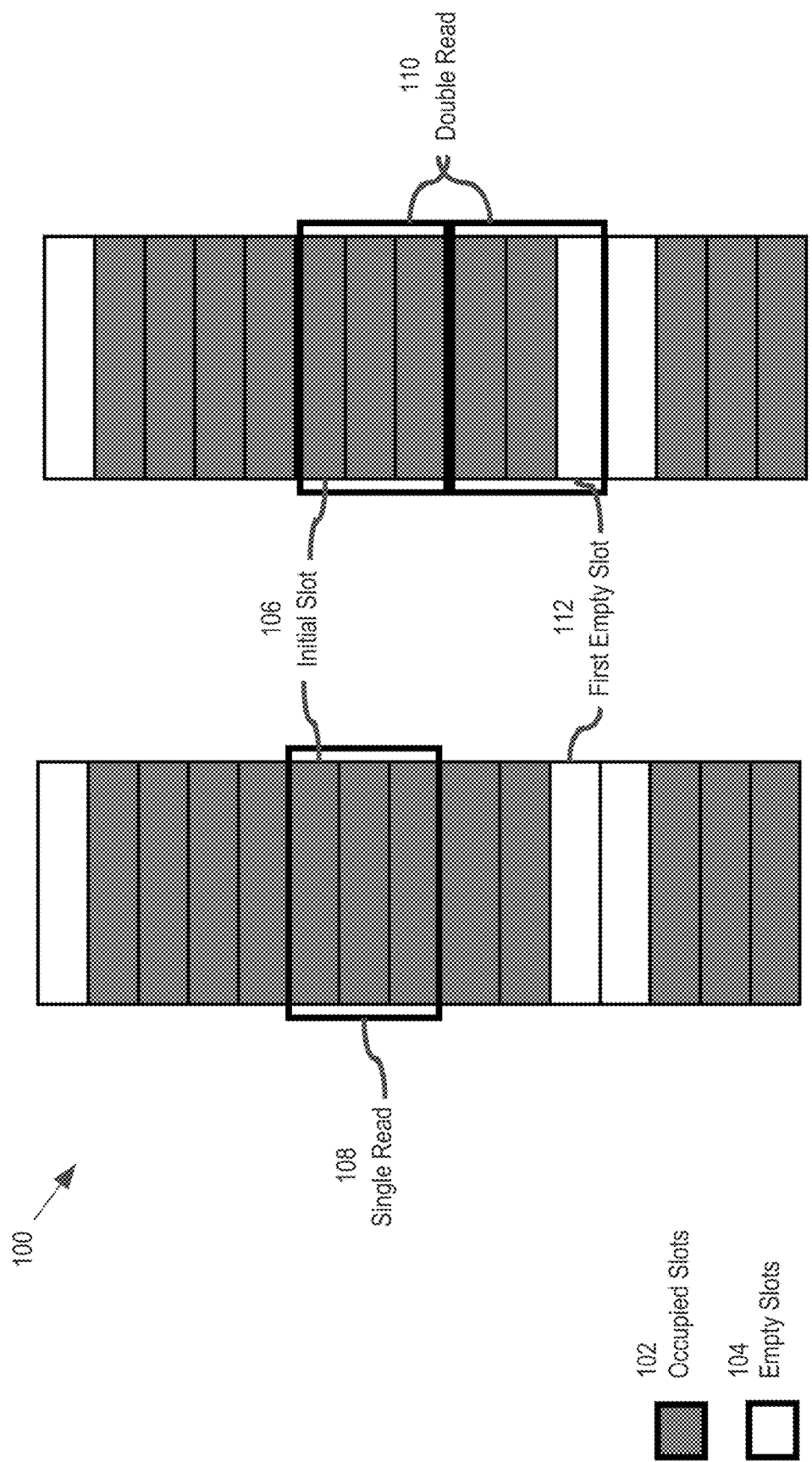
FIG. 1 depicts a practical example of performing RDMA reads on a remotely located linear hash table.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are described for reducing latency when probing a linear hash table. In an embodiment, a system receives a request that involves performing a probing operation on a remotely located linear hash table. The system determines a hashed-to slot for probing the linear hash table by computing a hash value from a key in the request. The system dynamically predicts how many slots should be read in a single RDMA read request in order to minimize the cost of performing the average probing operation. Predicting the number of slots to read may include (a) determining probabilities of reaching an empty slot in the linear hash table and (b) using the probabilities to predict a likely number of slots to read before encountering an empty slot. After dynamically predicting the number of slots to read in the single RDMA read request, the system sends an RDMA read request to the linear hash table. The RDMA read request includes data identifying (a) the predicted number of slots to return, and (b) the hashed-to slot.

The techniques described herein may additionally or alternatively used to evaluate the cost of probing a linear hash table as one of a plurality of possible query execution plans. In an embodiment, a system receives a query and identifies a plurality of possible query execution plans that could be used to respond to the query, including a particular query execution plan that comprises probing a linear hash table. The system evaluates the costs of the plurality of query execution plans, where evaluating the cost of probing the linear hash table comprises (a) predicting a number of slots to read in each RDMA read request, and (b) computing an average probing cost based on the predicted number of slots.

In an embodiment, a method comprises receiving a request to perform a probing operation on a remotely located linear hash table based on a key value; prior to performing the probing operation, dynamically predicting a number of slots for a single read of the linear hash table to minimize total cost for an average probing operation; determining a hash value based on the key value; determining a slot of the linear hash table to which the hash value corresponds; and after predicting the number of slots, issuing an RDMA request to perform a read of the predicted number of slots from the linear hash table starting at the slot to which the hash value corresponds.

Terminology Overview

The techniques described herein are applicable to processing data items, generally, such as data items stored and managed in a database. In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

Functional Overview of Cost-Efficient Hash Operations

Figure 2:
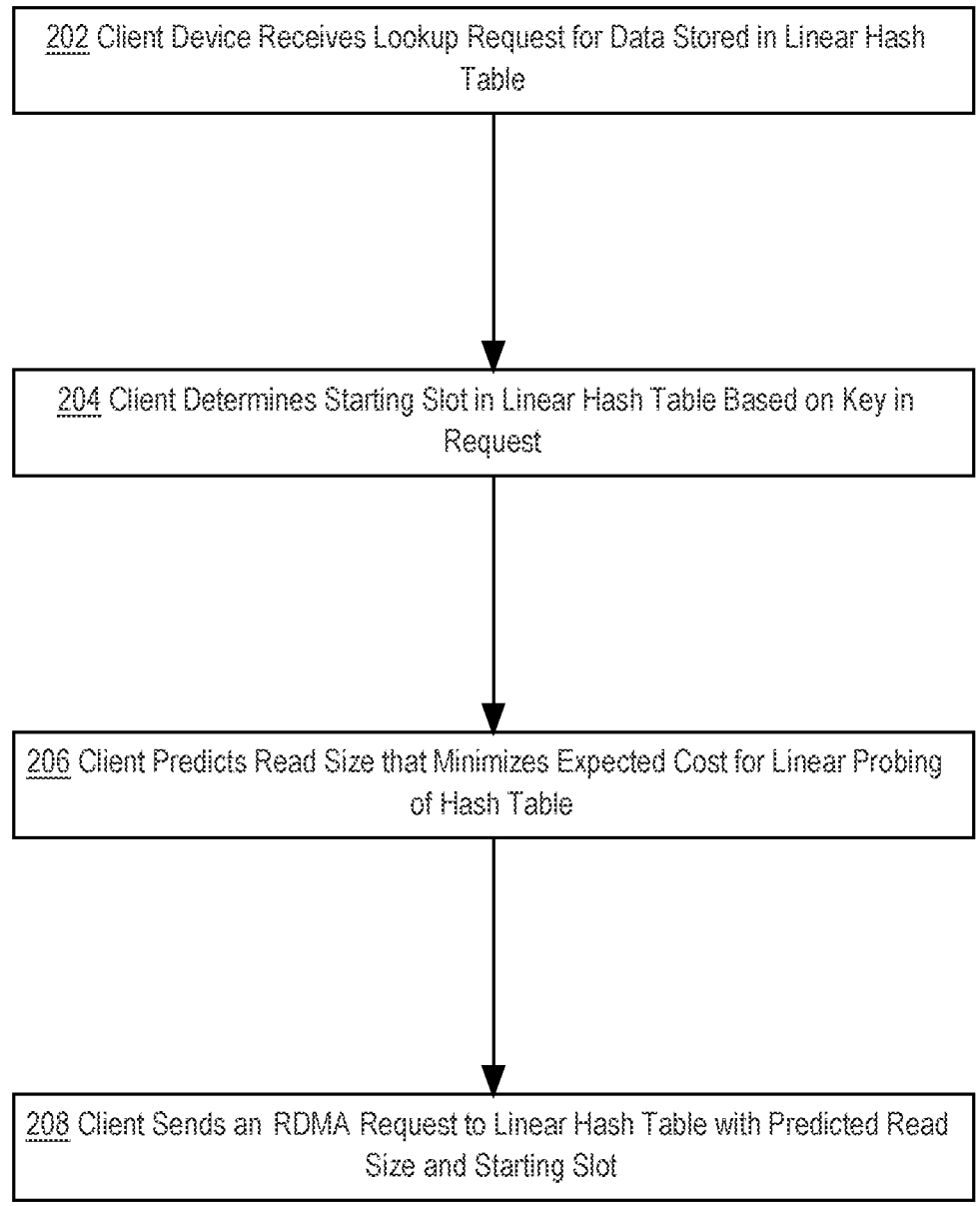
FIG. 2 depicts an example method of implementing cost-efficient hash operations on a remotely located linear hash table.

FIG. 2 depicts an example method of implementing cost-efficient hash operations on a remotely located linear hash table. The method of FIG. 2 may be performed by executing one or more sequences of instructions by one or more processors, such as within a computer system (e.g., computer system 400 of FIG. 4).

At step 202, a requesting device receives a hash operation request for data stored in a linear hash table. For example, the requesting device may receive a request to provide data based on a key value (a READ request) or to insert data into the hash table based on a key value (a WRITE request). In response to the hash operation request, the requesting device performs a probing operation on the linear hash table. The hash operation request may include a key value. The key value may be a fixed length, such as an integer, or variable length, such as a string.

At step 204, the requesting device determines a hashed-to slot in the linear hash table based on the key value in the request. For example, the requesting device may use the key value as an input into a hash function. The hash function may by any known hash function that transforms the key value into a hash value that can be used to identify a location in the linear hash table to begin the probing operation. For variable length keys, the hash function may include an algorithm for mapping the variable length keys into a fixed length key.

At step 206, the requesting device predicts a read size that minimizes an expected cost for linear probing of the hash table. The expected cost, as used herein, refers to a total cost for an average probing operation of the hash table. For example, the requesting device may generate a model of likely or average cost as a function of:

an average or likely number of reads to reach a first empty slot, a number of slots in a read, a size of the linear hash table,
a number of filled slots in the linear hash table,
a number of empty slots in the linear hash table, and/or
a cost of a single read.

The requesting device may compute a minimization of the model of likely cost over a number of slots in a single read. Methods for modeling the likely or average cost and computing the minimization are described further herein.

While FIG. 2 depicts step 206 being performed after step 204, in other embodiments, step 206 may be performed at any point in time prior to step 208. For example, in implementations where the requesting device does not have information as to the locations of empty slots and filled slots, the requesting device may predict a read size that would minimize the expected cost for linear probing prior to receiving the request to perform the probe and/or prior to computing the hashed-to slot. In an embodiment, the requesting device stores the read size value generally and updates the read size value when new information is added to the linear hash table.

At step 208, the requesting device sends an RDMA request to the linear hash table with the predicted read size and an identifier of the hashed-to slot. For example, the requesting device may send a single RDMA read requesting a particular number of slots. When the requesting device receives data from the particular number of slots, the requesting device may determine whether a data matching the key value of the hash operation request or an empty slot exists within the received data. If not, the requesting device may send a second RDMA read to the linear hash table with a next slot in the linear hash table as the hashed-to slot. This process may continue until an empty slot or data matching the key value of the hash operation request is identified.

In an embodiment, the requesting device reduces the predicted read size based on one or more threshold values. For example, the requesting device may be configured to determine whether the read size would exceed a messaging rate of a network link between the requesting device and the linear hash table. Thus, the threshold value may comprise a maximum message size determined based on a messaging rate of the network link. The requesting device may compute a message size based on the predicted number of slots and, if the message size is greater than the threshold value, the requesting device may reduce the number of slots so that the message size is below the threshold value.

In an embodiment, the second RDMA read used for a linear probe operation has a different read size than the first RDMA used for the linear probe operation. For example, the system may model variable read sizes for each read and/or may use knowledge of locations of empty or filled slots to update a requested number of slots. Methods for updating the requested number of slots are described further herein.

In an embodiment the hash operation request comprises a request to store new data in the linear hash table. The requesting device may perform the steps of 202-208 in order to identify the first empty slot in which to store data corresponding to the key value. When an empty slot is identified, the requesting device may send an RDMA write request to add the data to the linear hash table at the identified empty slot.

Modeling Read Size

As used herein, read size refers to a number of slots to read in a single RDMA read request. In an embodiment, the system predicts the read that minimizes a total cost for the average probing operation. Total cost, as used herein, may refer to total latency in responding to the RDMA read request or amount of data transmitted over a network to respond to the RDMA read request.

In an embodiment, the total cost of performing the average probing operation is computed as a function of (a) a first value comprising cost of performing a single read operation from a linear hash table, and (b) a second value comprising an expected number of reads to reach a first empty slot. Both the first and second values may be computed as a function of a number of slots per read. Thus, the system predicts the read size by using a minimization function to compute a value for the number of slots to read that minimizes the total cost of performing the average probing operation. An example equation is as follows:

$$R^* = \operatorname*{argmin}_{R}(E[X(R)] * t(R))$$

where R* is the read size that minimizes the total cost for the average probing operation, $E[X(R)]$ is the expected value of a number of reads to reach a first empty slot as a function of a number of slots per read (R), and $t(R)$ is a cost of a single read as a function of a number of slots per read (R).

In an embodiment, the cost of a single read is computed as a function of a fixed cost, a current network speed, and a number of slots per read. For example, the cost of a single read may be computed as:

$$t(R) = c + \frac{b(R) * R}{s}$$

where c is a fixed cost computed as a latency of a 0-byte RDMA read given a current network speed, b(R) is a size of a single slot, and s is a speed of the network. The size of the single slot and speed of the network may be computed using similar units, such as bytes per slot for b(R) and bytes per second for s. The current network speed may be measured prior to the computation and/or estimated based on any available data, such as previous network speeds. Similarly, the fixed cost may be estimated or measured prior to the computation.

In an embodiment, the expected value for the number of reads to reach the first empty slot is computed as a summation of weighted probabilities. The weighted probabilities may be computed as a product of a number of reads and a probability that the first empty slot would be found after the number of reads but not after a smaller of reads. An example equation for computing the expected value of the number of reads to reach the first empty slot is as follows:

$$E[X(R)] = \sum_i i * Prob_i(R)$$

where i is the number of reads and $Prob_i(R)$ is the probability that the first empty slot is identified only after exactly i reads with a read size of (R). $Prob_i(R)$ may be computed as a function of the cumulative probability ($C_k$) of reaching the empty slot after k reads, where the cumulative probability is computed as $C_k = \sum_{i=0}^{k} P_i$ with $P_i$ comprising a probability comprising the probability that the empty slot is exactly (i+1) slots from the starting probe. An example equation for the probability that the first empty slot is identified only after exactly i reads is as follows:

$$Prob_i(R) = \begin{cases} C_{i*R-1} - C_{(i-1)*R-1} & (i > 1) \\ C_{R-1} & (i = 0) \end{cases}$$

In an embodiment, the system uses a total number of slots of the hash table (M) and a number of occupied slots in the hash table (N) to compute the probability $P_i$. For example, the system may model a number of hash sequences f(M, N) that make a starting position empty and a number of hash sequences g(M, N, k) that make the hashed-to slot empty, a block of slots (1 through k) occupied, and a position after the block of slots (k+1) empty. Example equations for f(M, N) and g(M, N, k) are provided below:

$$f(M, N) = \left(1 - \frac{N}{M}\right) M^N$$

$$g(M, N, k) = \binom{N}{k} f(k+1, k) f(M - k - 1, N - k)$$

The probability, $P_i$, can be expressed as a function of g(M, N, k), such as through the following equation:

$$P_k = \begin{cases} 1 - \frac{N}{M} & (k = 0) \\ P_{k-1} - M^{-N} g(M, N, k-1) & (k > 0) \end{cases}$$

As the probability value above is dependent on only a number of slots in the hash table and a number of occupied slots, $Prob_i(R)$ can be computed for a specific number of slots (R) as a function of the number of slots in the hash table and the number of occupied slots. As long as the system stores those two values, the system can compute the probabilities using the equations described above. The initial equation for modeling the read size that minimizes the total cost for the average probing operation thus includes only one dynamic variable, the read size. In an embodiment, the requesting device receives stores data identifying a size of the hash table and receives data indicating the number of slots of the hash table that are occupied. The requesting device may receive updates when items are added to the hash table. Alternatively, if the requesting device is the only device capable of writing to the hash table, the requesting device may track the number of filled slots by incrementing a value each time the requesting device sends an RDMA write request to the hash table.

Using Previous Read Data in the Model

In an embodiment, the system uses previous read data to identify clusters of occupied slots in the linear hash table. For example, after performing a probing operation on the linear hash table, the system will have received data from one or more reads comprising a plurality of slots in the linear hash table. From the data corresponding to the one or more reads, the system identifies a plurality of slots that were occupied. The system may store data identifying the plurality of slots as a cluster of slots, beginning at the hashed-to slot and continuing until the last slot identified as occupied. The last slot identified as occupied may include an occupied slot prior to an empty slot and/or a last occupied slot in a grouping of slots that include requested data. For example, if three slots are read per RDMA read, two RDMA reads are performed until a slot is identified that corresponds to the key value, and no empty slots are identified, the system may identify a cluster of six slots that are occupied.

The system may store data identifying a beginning slot in the cluster and a length of the cluster. Thus, if a probing operation is performed starting at slot fifteen and an empty slot is identified at slot twenty, they system may store a tuple with an identifier of slot fifteen, and a value of five to indicate that the length of the cluster is five slots long. Other options for storing clusters may include storing data identifying a location of a first slot in the cluster and a last slot in the cluster.

The system may be configured to combine overlapping clusters. For example, when the system stores a new cluster, the system may determine if the hashed-to slot of the new cluster is within another stored cluster or if the hashed-to slot of another stored cluster is within the new cluster. If an overlapping cluster is identified, the system may combine the clusters by setting the hashed-to slot to the earliest slot of the two clusters and increasing the length of the cluster to the greater of the cluster size of the cluster with the earliest slot or the size of the cluster with the later hashed-to slot plus a number of slots between the earliest hashed-to slot and the other hashed-to slot.

In an embodiment, the system stores locations of empty slots as well as locations of clusters. For example, if the system is updated when data is added to the linear hash table, the system may store data identifying locations of empty slots based on previous searches and update the stored data when a data item is stored. The update may include indicating that a previously empty slot is now occupied if the system can identify the slot in which the data item is stored. Additionally or alternatively, the update may include marking data identifying previously empty slots as invalid and/or removing data identifying previously empty slots. Thus, if the requesting device does not receive data identifying where new data items are stored in the linear hash table, the requesting device may still use RDMA read results to identify and store locations of empty slots which can be used at any point prior to new data being stored in the linear hash table.

The system may be configured to only store a subset of clusters identified during RDMA reads in order to keep storage and hash operation costs low when using previous read data in the model. For example, the system may be configured to only store data identifying the top five largest clusters. When a new cluster is identified, data identifying the new cluster may be added to stored cluster data only if less than the threshold number of clusters are stored or if the new cluster is larger than at least one previously stored cluster.

Stored cluster data may be used to strengthen the model of the cost of performing the average probing operation. For instance, the probability that the empty slot is exactly (i+1) slots from the starting probe can be modified given known locations of occupied slots, as the probability of an empty slot being in a location of a known occupied slot is 0. As an example, the probability may be modified as follows:

$$P_k = \begin{cases} 0 & (\exists i, h_i \le L + k + 1 < h_i + len_i) \\ 1 - \sum_{j=0}^{h_i - L - 1} P_j & (\exists i, L + k + 1 = h_i + len_i) \end{cases}$$

where $h_i$ is the hashed-to slot of a cluster, L is the hashed-to slot of the probing operation, and $len_i$ is the length of the cluster.

Using the stored cluster information, the system is able to improve on the computations of the probability that a slot is empty or occupied by setting the probability of an empty slot to 0 for any slots within a cluster and/or setting the probability of an empty slot to 1 for any slots that match an empty slot.

Modifying Read Size During Probing

In an embodiment, the system modifies the read size during the probing operation. For example, the system may predict a first read size that minimizes the total cost for the average probing operation prior to requesting the first read of the remotely located linear hash table. The requesting device may predict a second read size for a second RDMA read request based on the results from the first RDMA read request not including data corresponding to the key value or an empty slot. If the results of the first RDMA read request do not include data corresponding to the key value or an empty slot, the system may send a second RDMA read request with the second read size to the linear hash table. Thus, the system can dynamically alter the size of the RDMA read request using updated information.

In an embodiment, the read size is updated based on stored data indicating locations of clusters and/or empty slots in the linear hash table. For example, if a read size for a first three RDMA reads was three slots and stored data indicates that an empty slot is known to exist within the next two slots, the system may reduce the read size to two slots instead of three slots. As another example, if the read size for a first request is three slots and a next slot to read begins a cluster of three slots, the requesting device may increase the read size to four slots so that the next read will capture at least one slot more than the upcoming cluster.

In an embodiment, the read size is recomputed using the equations described above, but with the hashed-to slot, $h_i$, moved to the hashed-to slot of the next RDMA read. Thus, using the modified probability equation, the probability values would shift based on the changed location of the hashed-to slot with respect to the locations of the cluster, thereby affecting the minimized read size value.

In an embodiment, the read size is recomputed with changed assumptions on the size and occupancy of the linear hash table. For example, if the first read size is three slots long, the system may reduce the total number of slots in the linear hash table (M) by three and the total number of occupied slots (N) by three. By reducing both values by the previous read size, the system takes into account a changed proportion of empty slots to occupied slots in the linear hash table based on knowledge that the three previously read slots were all occupied and will not be read again in the current probing operation.

The read size updating may be performed at any time in the process. For example, the system may compute read sizes for a plurality of reads prior to sending the first read, where the system assumes for future reads that the returned results of each previous read included only occupied slots that did not correspond to the key value. Each of the plurality of reads may have a starting location determined by the individual read sizes from previous reads. For example, if a first read is three slots and a second read is four slots, the third read may have a hashed-to slot located at seven slots from the hashed-to slot corresponding to the hash value. Alternatively, a new read size may be updated after first read results are received, thereby allowing the system to reduce a number of computations by computing new read sizes after a determination is made that a previous read did not return an empty slot or data corresponding to the key value.

Selecting Query Plans

Figure 3:
FIG. 3 depicts an example method for using estimated read sizes to determine whether to use a probe of a linear hash table to respond to a query.

The process of dynamically determining read sizes for probes of linear hash tables can reduce the latency cost of executing a linear probing operation. In an embodiment, the dynamically determined read sizes described above is used to evaluate a cost of using the linear hash table as one of a plurality of query execution plans for responding to a particular query. FIG. 3 depicts an example method for using estimated read sizes to determine whether to use a probe of a linear hash table to respond to a query.

At step 302, a request to execute a query is received. The request may be received over a network by the requesting device or through user input. The request may include one or more data values as inputs to the search.

At step 304, the system identifies a plurality of query execution plans including a probing operation on a remotely located linear hash table based on a key value. For example, the system may determine that the requested data value is stored in a plurality of locations, such as a columnar datastore, an index, a database, a linear hash table, a cuckoo hash table, or other data structure. The system may make the determination based on known storage locations, a type of data being requested, or other attributes of the request. Additionally or alternatively, the request may identify a plurality of locations in which the data value may be stored.

At step 306, the system determines a cost of each of the plurality of query execution plans, including computing a cost of performing the linear probing operation with a predicted number of slots for a single read. For example, when evaluating the linear probing operation, the system may predict the number of slots that minimize the cost of the average probing operation using the equations described above. The system may then compute the average cost of performing the probing operation using the predicted number of slots, such as through the following equation:

$$Cost = E[X(R)] * t(R)$$

Any method may be used for computing costs of the other query execution plans. For example, the system may store average latencies for searching one or more other data structures based on data from previous searches. Other more sophisticated methods may also be used. For example, the system may compute the cost of retrieving a block of data from a database or the cost of sending RDMA read requests to a cuckoo hash table at a plurality of different locations in the cuckoo hash table.

At step 308, based on the cost of each of the plurality of query execution plans, the system selects a query execution plan and uses the selected query execution plan to respond to the query. For example, the requesting device may compare the cost of using the linear hash table as computed above with the cost or costs of using one or more other query execution plans. If the linear hash table has the lowest cost of the plurality of query execution plans, the system may select the linear hash table to respond to the query. If a different query execution plan has a lower cost, the system may select the different query execution plan.

In an embodiment, a similar technique may be used to prioritize query execution plans when the device is unable to determine where, in a plurality of locations, the requested data is stored. For example, if different data is stored in a columnar datastore than the linear hash table, the system may use the method described above to compute a cost of checking the columnar datastore first or the linear hash table first. If the cost of checking the linear hash table is lower than the cost of checking the columnar datastore, the system may select the linear hash table.

Additionally or alternatively, the system may use the cost as part of a more complex computation. For example, the system may compute a product of the cost of checking each location and a likelihood that the data value is stored in each location. The likelihood may be computed as a function of the amount of data stored in each location or any other known information. For example, if half of the data stored in the columnar data store is repeated as the only data in the linear hash table, the system may determine that the likelihood for the linear hash table is 50% and the likelihood for the columnar datastore is 100%. The system may use the resultant values to determine an optimal order for checking each location. Thus, the system may check locations that are less likely to contain the information if the cost of checking is relatively low or, alternatively, the system may check locations with a higher cost if the likelihood that other locations contain the data are low enough.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
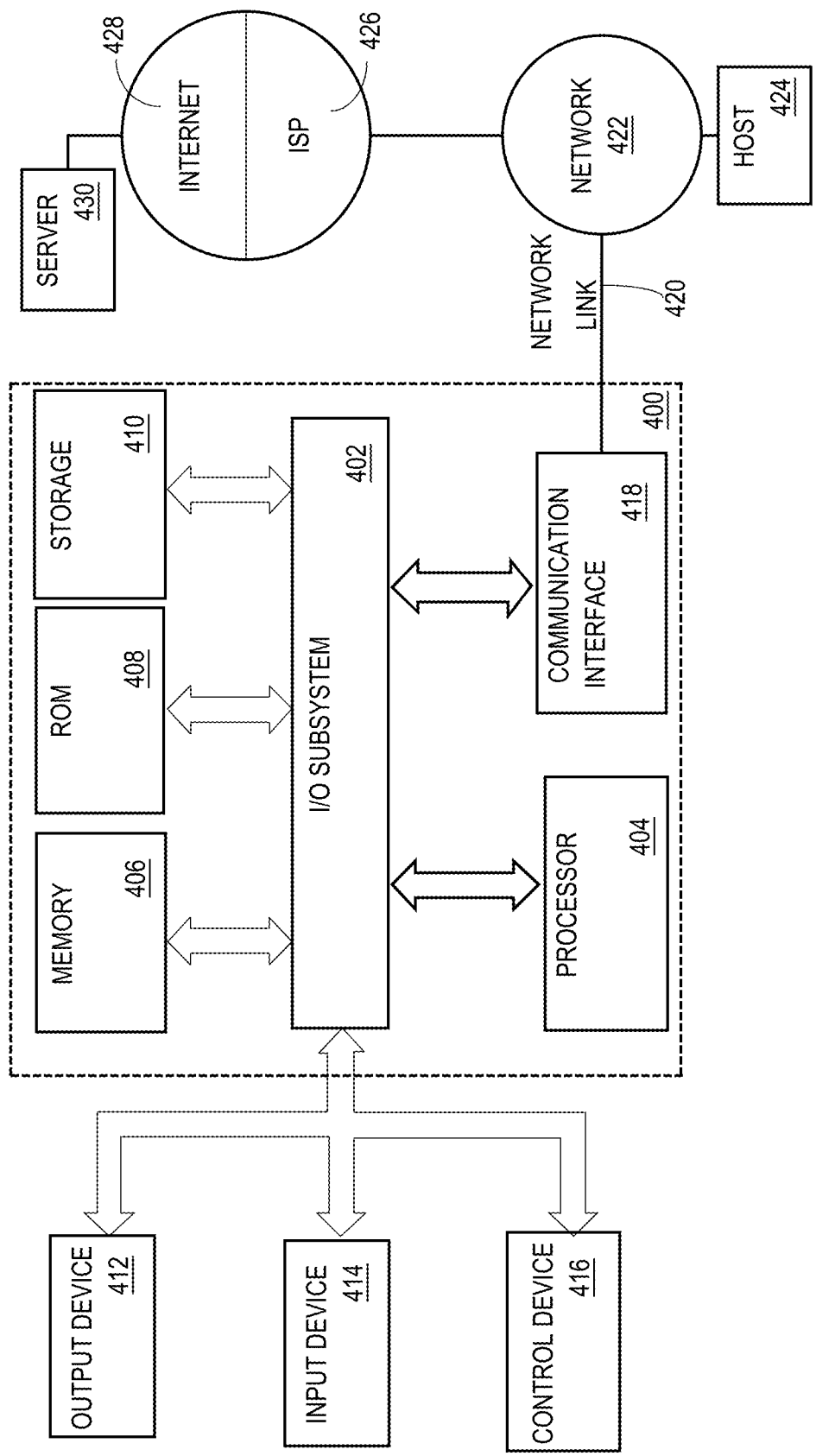
FIG. 4 is a block diagram of a computer system on which embodiments may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
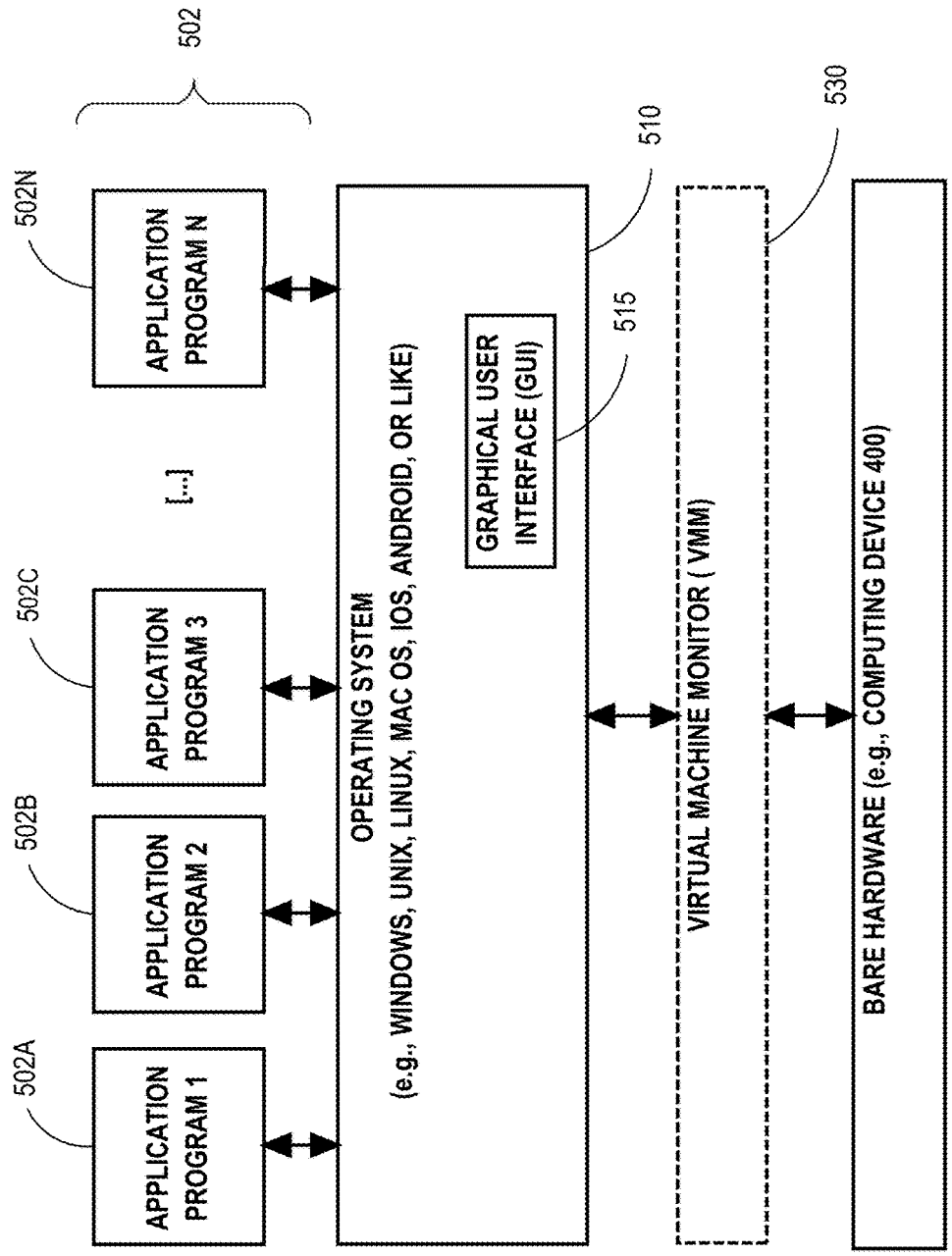
FIG. 5 depicts a software system that may be used in an embodiment.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   one or more processors;
   a memory storing instructions which, when executed by the one or more processors, causes performance of:
   receiving a request to perform a probing operation on a remotely located linear hash table based on a key value;
   prior to performing the probing operation, dynamically predicting a first number of slots for a single read of the linear hash table that minimizes total cost for an average probing operation;
   determining a hash value based on the key value;
   determining a slot of the linear hash table to which the hash value corresponds; and
   after predicting the first number of slots, issuing a first remote direct memory access (RDMA) request to perform a read of the predicted first number of slots from the linear hash table starting at the slot to which the hash value corresponds.

2. The system of claim 1, wherein dynamically predicting the first number of slots for a single read of the linear hash table to minimize total cost for the average probing operation comprises:
   generating a first value comprising a cost of performing a single read operation from the linear hash table as a function of a number of slots per read;
   generating a second value comprising an expected number of reads to reach a first empty slot as a function of the number of slots per read;
   computing the predicted first number of slots as a minimization over the number of slots per read of a function comprising the cost of performing the single read operation and the expected number of reads to reach the first empty slot.

3. The system of claim 2, wherein computing the expected number of reads to reach the first empty slot comprises computing a summation of a plurality of weighted probabilities, each of the plurality of weighted probabilities computed as a product of a number of reads and a probability that the first empty slot would be found after the number of reads but not after a smaller number of reads.

4. The system of claim 3, wherein each of the plurality of weighted probabilities is computed based, at least in part, on a number of slots in the linear hash table and a number of empty slots in the linear hash table.

5. The system of claim 1, wherein the instructions, when executed by the one or more processors, further cause performing:
   receiving a second request to perform a second probing operation on the remotely located linear hash table based on a second key value;
   prior to performing the second probing operation, dynamically predicting a second number of slots for a single read of the linear hash table to minimize total cost for the average probing operation;
   determining that the second number of slots is greater than a stored threshold number of slots;
   determining a second hash value based on the second key value;

determining a second slot of the linear hash table to which the second hash value corresponds;

in response to determining that the second number of slots is greater than the stored threshold number of slots, issuing a second RDMA request to perform a second read with the threshold number of slots from the linear hash table starting at the slot to which the hash value corresponds.

6. The system of claim 1, wherein the instructions, when executed by the one or more processors, further cause performing:

after issuing the RDMA request to read the predicted first number of slots from the linear hash table starting at the slot to which the hash value corresponds, identifying, based on one or more results of the RDMA request, a location in the linear hash table of a plurality of occupied slots;

receiving a second request to perform a second probing operation on the remotely located linear hash table based on a second key value;

determining a second hash value based on the second key value;

determining a second slot of the linear hash table to which the second hash value corresponds;

prior to performing the second probing operation, dynamically predicting a second number of slots for a single read of the linear hash table to minimize total cost for the average probing operation, wherein predicting the second number of slots for a single read of the linear hash table to minimize total cost for the average probing operation comprises setting a probability of encountering an empty slot to zero for each of the plurality of occupied slots; and issuing a second RDMA request to perform a read with the predicted second number of slots from the linear hash table starting at the second slot to which the second hash value corresponds.

7. The system of claim 1, wherein the instructions, when executed by the one or more processors, further cause performing:

predicting a second number of slots for a second read of the linear hash table to minimize cost for an average probing operation;

receiving results of the RDMA read request;

determining that the results do not include an empty slot or data corresponding to the key value and, in response, issuing a second RDMA request to perform a read of the predicted second number of slots from the linear hash table.

8. The system of claim 7, wherein the second number of slots is predicted prior to issuing the first RDMA request.

9. A method comprising:

receiving a request to perform a probing operation on a remotely located linear hash table based on a key value;

prior to performing the probing operation, dynamically predicting a first number of slots for a single read of the linear hash table that minimizes total cost for an average probing operation;

determining a hash value based on the key value;

determining a slot of the linear hash table to which the hash value corresponds; and after predicting the first number of slots, issuing a first remote direct memory access (RDMA) request to perform a read of the predicted first number of slots from the linear hash table starting at the slot to which the hash value corresponds.

10. The method of claim 9, wherein dynamically predicting the first number of slots for a single read of the linear hash table to minimize total cost for the average probing operation comprises:

generating a first value comprising a cost of performing a single read operation from the linear hash table as a function of a number of slots per read;

generating a second value comprising an expected number of reads to reach a first empty slot as a function of the number of slots per read;

computing the predicted first number of slots as a minimization over the number of slots per read of a function comprising the cost of performing the single read operation and the expected number of reads to reach the first empty slot.

11. The method of claim 10, wherein computing the expected number of reads to reach the first empty slot comprises computing a summation of a plurality of weighted probabilities, each of the plurality of weighted probabilities computed as a product of a number of reads and a probability that the first empty slot would be found after the number of reads but not after a smaller number of reads.

12. The method of claim 11, wherein each of the plurality of weighted probabilities is computed based, at least in part, on a number of slots in the linear hash table and a number of empty slots in the linear hash table.

13. The method of claim 9, further comprising:

receiving a second request to perform a second probing operation on the remotely located linear hash table based on a second key value;

prior to performing the second probing operation, dynamically predicting a second number of slots for a single read of the linear hash table to minimize total cost for the average probing operation;

determining that the second number of slots is greater than a stored threshold number of slots;

determining a second hash value based on the second key value;

determining a second slot of the linear hash table to which the second hash value corresponds;

in response to determining that the second number of slots is greater than the stored threshold number of slots, issuing a second RDMA request to perform a second read with the threshold number of slots from the linear hash table starting at the slot to which the hash value corresponds.

14. The method of claim 9, further comprising:

after issuing the first RDMA request to read the predicted first number of slots from the linear hash table starting at the slot to which the hash value corresponds, identifying, based on one or more results of the first RDMA request, a location in the linear hash table of a plurality of occupied slots;

receiving a second request to perform a second probing operation on the remotely located linear hash table based on a second key value;

determining a second hash value based on the second key value;

determining a second slot of the linear hash table to which the second hash value corresponds;

prior to performing the second probing operation, dynamically predicting a second number of slots for a single read of the linear hash table to minimize total cost for an average probing operation, wherein predicting the second number of slots for a single read of the linear table to minimize total cost for the average probing operation comprises setting a probability of encountering an empty slot to zero for each of the plurality of occupied slots; and issuing a second RDMA request to perform a read with the predicted second number of slots from the linear hash table starting at the second slot to which the second hash value corresponds.

15. The method of claim 9, further comprising:

predicting a second number of slots for a second read of the linear hash table to minimize cost for an average probing operation;

receiving results of the RDMA read request;

determining that the results do not include an empty slot or data corresponding to the key value and, in response, issuing a second RDMA request to perform a read of the predicted second number of slots from the linear hash table.

16. The method of claim 15, wherein the second number of slots is predicted prior to issuing the first RDMA request.

* * * * *